US010863345B2

(12) United States Patent
Schouler

(10) Patent No.: US 10,863,345 B2
(45) Date of Patent: Dec. 8, 2020

(54) TECHNIQUE FOR ADMINISTRATING A SUBSCRIPTION TO AN ADMINISTRATOR

(71) Applicant: ORANGE, Paris (FR)

(72) Inventor: Eric Schouler, Chatillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/484,679

(22) PCT Filed: Feb. 6, 2018

(86) PCT No.: PCT/FR2018/050283
§ 371 (c)(1),
(2) Date: Aug. 8, 2019

(87) PCT Pub. No.: WO2018/146407
PCT Pub. Date: Aug. 16, 2018

(65) Prior Publication Data
US 2020/0107183 A1  Apr. 2, 2020

(30) Foreign Application Priority Data
Feb. 9, 2017 (FR) ...................................... 17 51070

(51) Int. Cl.
*H04W 8/00* (2009.01)
*H04W 4/60* (2018.01)
(Continued)

(52) U.S. Cl.
CPC ............. *H04W 8/183* (2013.01); *H04W 4/60* (2018.02); *H04W 8/205* (2013.01);
(Continued)

(58) Field of Classification Search
CPC ... H04W 8/183; H04W 88/06; H04W 12/004; H04W 8/205; H04W 12/0023;
(Continued)

(56) References Cited

U.S. PATENT DOCUMENTS 7,103,018 B1 * 9/2006 Hansen ................... H04L 67/14
370/328
9,906,944 B2 * 2/2018 Lee ........................ H04W 48/16
(Continued)

FOREIGN PATENT DOCUMENTS

| EP | 2963955 A1 | 1/2016 |
| EP | 2975870 A1 | 1/2016 |
| EP | 3073770 A1 | 9/2016 |

OTHER PUBLICATIONS

English translation of the Written Opinion of the International Searching Authority dated Mar. 23, 2018 for corresponding International Application No. PCT/FR2018/050283, filed Feb. 6, 2018.
(Continued)

*Primary Examiner* — Andrew Wendell
(74) *Attorney, Agent, or Firm* — David D. Brush; Westman, Champlin & Koehler, P.A.

(57) ABSTRACT

A technique for administrating a subscription to an operator. This subscription allows access to a communication network for a security module associated with a user device. A contact address of a server configured to prepare subscription management data is obtained on the basis of an access profile for the network installed in the security module. The security module sends a request for execution of an act of administration in conjunction with this subscription. The request is addressed to the contact address of the server and comprises a datum allowing the server to forward the request to a control server. Once the act of administration has been executed, the user device receives a confirmation of execution of this act of administration originating from the control server.

11 Claims, 2 Drawing Sheets

(51) Int. Cl.
*H04B 1/3816* (2015.01)
*H04W 8/18* (2009.01)
*H04W 12/00* (2009.01)
*H04W 8/20* (2009.01)
*H04W 88/06* (2009.01)

(52) U.S. Cl.
CPC ..... *H04W 12/004* (2019.01); *H04W 12/0023* (2019.01); *H04W 88/06* (2013.01)

(58) Field of Classification Search
CPC . H04W 4/60; H04B 7/18565; H04B 7/18593; H04B 10/0705; H04B 1/3816; H04L 9/0877; H04L 9/0897; H04L 9/3234
See application file for complete search history.

(56) References Cited

U.S. PATENT DOCUMENTS

| | | | | |
|---|---|---|---|---|
| 10,321,301 | B2* | 6/2019 | Larignon | H04W 8/183 |
| 2014/0011541 | A1* | 1/2014 | Cormier | H04L 63/0823 |
| | | | | 455/558 |
| 2016/0021484 | A1* | 1/2016 | Park | H04W 12/02 |
| | | | | 455/418 |
| 2016/0301529 | A1 | 10/2016 | Park et al. | |
| 2019/0357038 | A1* | 11/2019 | Schouler | H04W 8/20 |

OTHER PUBLICATIONS

RSP Technical Specification Version 2.0 Oct. 14, 2016. GSM Association. SGP.22—v2.0.
RSP Architecture Version 2.0 Aug. 23, 2016. GSM Association. SGP.21-v2.0.
Samsung: "Updates to Solution #12.4 to detail EAP-TLS authentication procedure", 3GPP Draft; S3-161803-RemoteEAP-TLS. 3rd Generation Partnership Project (3GPP), Mobile Competence Centre; 650, Route Des Lucioles ; F-06921 Sophia-Antipolis Cedex ; France, vol. SA WG3 Nov. 6, 2016 (Nov. 6, 2016), XP051185874.
International Search Report dated Mar. 23, 2018 for corresponding International Application No. PCT/FR2018/050283, filed Feb. 6, 2018.
Written Opinion of the International Searching Authority dated Mar. 23, 2018 for corresponding International Application No. PCT/FR2018/050283, filed Feb. 6, 2018.

* cited by examiner

TECHNIQUE FOR ADMINISTRATING A SUBSCRIPTION TO AN ADMINISTRATOR

CROSS-REFERENCE TO RELATED APPLICATIONS

This Application is a Section 371 National Stage Application of International Application No. PCT/FR2018/050283, filed Feb. 6, 2018, the content of which is incorporated herein by reference in its entirety, and published as WO 2018/146407 on Aug. 16, 2018, not in English.

FIELD OF THE DISCLOSURE

The invention pertains to the general field of telecommunications.

The invention relates more particularly to a technique for administrating a subscription to an operator. More precisely, this technique is concerned with a context in which an access profile has been obtained for a security module.

This administration technique lies in the field of mobile communication terminals, and more particularly of so-called embedded eUICC cards. An embedded eUICC card allows a mobile user device to operate with subscriptions with several operators with one and the same eUICC card which may be non-removable.

BACKGROUND OF THE DISCLOSURE

The GSMA association (for "Global System for Mobile Communications") is developing technical specifications for a card of "eUICC" type (from the English "embedded Universal Integrated Circuit Card") playing the role of a security module, intended to be embedded in a mobile user device. Such a security module may be irremovable and it is then necessary to perform remote actions, for example program it. The GSMA technical specification "SGP.22—RSP Technical Specification" v.2.0 dated 14 Oct. 2016 specifies remote configuration management of an eUICC card (or security module). Thus, when acquiring a new mobile terminal, it is no longer necessary to manipulate the security module beforehand in order to access an operator's network, or indeed to change it upon a change of operator. An access profile corresponds to a set of data and of applications which allow the mobile terminal, once the profile has been activated, to access an operator's network. Provision is made for a user to be able to subscribe directly via a man-machine interface of his user device, or by going to a shop of the operator or/and for him to install an access profile for accessing the network. Provision is also made for him to be able change operator in the same manner.

Accordingly, the user obtains an activation code AC (for "Activation Code") allowing him to contact a server responsible for preparing the subscription management data SM-DP+ (for "Subscription Manager Data Preparation+") so as to download an access profile that has been prepared for him. This activation code comprises in particular an address of the server SM-DP+ to be contacted so as to obtain the access profile and a reference allowing the server to identify this access profile.

To administer a subscription, a user or a manager of a pool of mobile user devices must connect up to a portal of the operator, authenticate himself, search for his subscription with this operator, and then perform the desired act of administration.

This solution is therefore not satisfactory for the user or the pool manager since it requires numerous interactions with the operator's information system.

SUMMARY

One of the aims of the invention is to remedy inadequacies/drawbacks of the prior art and/or to afford improvements thereto.

According to a first aspect, the subject of the invention is a method for administrating a subscription to an operator, said subscription allowing access to a communication network for a security module associated with a user device. This method comprises:

an obtaining by the user device on the basis of an access profile for accessing the communication network installed in the security module of a contact address of a server configured to prepare subscription management data;

a sending by the security module of a request for execution of an act of administration in conjunction with said subscription, the request being addressed to the contact address of the server and comprising a datum allowing said server to forward the request to a control server;

a receiving by the user device of a confirmation of execution of said act of administration.

Correlatively, the subject of the invention is also a method for administrating a subscription to an operator, said subscription allowing access to a communication network for a security module associated with a user device. This method comprises:

a receiving by a server configured to prepare subscription management data of a request for execution of an act of administration in conjunction with said subscription originating from the security module, the request being addressed to the contact address of the server and comprising a datum allowing said server to forward the request to a control server, said address having been obtained on the basis of an access profile for accessing the communication network installed in the security module;

a transmitting of the request for execution by said server to the control server as a function of said datum;

a transmitting of a received confirmation of execution of said act of administration from the control server to the user device.

By virtue of this technique, the user or the pool manager can carry out in a very simple manner an act of administration within the framework of a subscription comprising the security module associated with the user device. Indeed, the user or the pool manager controls this act of administration directly from the mobile terminal, formed of the user device and of the security module, without needing to interact with a subscriptions management system. It is not necessary for the user or the pool manager to know and to supply a contractual subscription number in order to connect to a portal of the operator managing the subscription. Moreover, no authentication is necessary. In a particular embodiment, this request for execution of an act of administration is performed by means of a man-machine interface offered by the user device.

Moreover, the technique for administrating a subscription is applicable to various types of security modules, such as cards of "eUICC" type, chip cards with an operating system offering the functionalities of a card of eUICC type.

In this technique, the contact address allowing the security module to contact the server which is responsible for preparing the subscription management data for the operator of the communication network is included in the access profile. Once the access profile has been downloaded and installed in the security module, it is then possible to access the access profile in order to obtain the contact address. It is recalled here that according to the earlier technique a security module obtains this contact address on the basis of an activation code which has been prepared for it in order to download an access profile. Once the access profile has been downloaded and installed, the activation code is deleted from the memory of the user device.

The datum sent by the security module allows the server responsible for preparing the subscription management data to identify the operator managing the subscription and to thus interrogate a control server of this operator. The server delegates the processing of the request for execution of the act of administration. If such an act is authorized, a response to be transmitted to the security module and to the user device can then be provided by the identified control server to the server responsible for preparing the subscription management data.

The exchanges for requesting execution of the act of administration is thus performed by way of the server SMDP+. It is recalled here that in the architecture defined by the GSMA, a tunnel is established between the security module and the server SM-DP+. This makes it possible to protect data sent with the request. This technique does not involve the transmission, outside of protected interfaces, of a sensitive identifier, such as the user's access identifier with the network operator. This access identifier is more generally known by the name IMSI (for "International Mobile Subscriber Identity") and makes it possible to uniquely identify the user in the operator's network.

The various embodiments or characteristics of realization mentioned hereinafter can be added independently or in combination with one another, to the method for administrating a subscription such as defined above.

In a particular embodiment of the administration method, the confirmation of execution comprises a location address of a portal to which the user device connects.

By way of this location address, it is thus possible to put in place exchanges between the portal and a user of the device. This makes it possible to obtain complementary data, necessary for finalizing the execution of the act of administration in the operator's information system.

According to a particular characteristic of the administration method, the location address is specific to the security module and allows the portal to retrieve the context of the request for execution of the act of administration by interrogating the control server.

According to an alternative particular characteristic of the administration method, the confirmation of execution furthermore comprises a reference associated with a context of the request for execution of the act of administration.

The reference allocated by the control server allows the portal to retrieve the context of the request for execution of the act of administration by interrogating the control server.

In a particular embodiment of the administration method, the datum allowing the server to interrogate the control server is obtained on the basis of the access profile.

In this technique, the datum allowing the server responsible for preparing the subscription management data for the operator of the communication network to forward the request for execution of an act of administration is included in the access profile. Once the access profile has been downloaded and installed in the security module, it is then possible to access the access profile in order to obtain this datum. This simplifies the implementation of the method for the user or the pool manager. This involves for example an identifier of the operator.

In a particular embodiment of the administration method, the user device obtains from the security module the datum allowing the server to interrogate the control server.

The security module, once an access profile has been downloaded, is identified by an access profile identifier ICCID (for "Integrated Circuit Card ID") which is unique. In this embodiment, the datum allowing the server to interrogate the control server is deduced on the basis of this identifier ICCID. This simplifies the implementation of the method for the user or the pool manager.

The contact address of the server as well as the datum allowing the server to interrogate the control server are for example stored in data of the downloaded access profile. This allows the security module, which has stored an access profile, to readily retrieve these data.

In a particular embodiment of the administration method, the datum allowing the server to interrogate the control server furthermore allows the control server to identify the subscription. By way of illustration, the control server can determine on the basis of the access profile identifier ICCID which is the associated subscription. Thus, the user or the pool manager need not provide a subscription identifier.

In a particular embodiment of the administration method, the request sent furthermore comprises a subscription identifier in respect of a subscription to the operator.

In this embodiment, the datum allowing the server to interrogate the control server makes it possible to identify the network operator and the subscription identifier is provided in addition.

In a particular embodiment of the administration method, the act of administration belongs to the group comprising:
a request for modification of a subscription;
a request for an activation code;
a suspension of the access profile.

According to a second aspect, the invention also relates to a user device with which is associated a security module. This device comprises:
a command module, designed to obtain on the basis of an access profile for accessing the communication network installed in the security module a contact address of a server configured to prepare subscription management data and to command the security module to send a request for execution of an act of administration in conjunction with a subscription to an operator, said subscription allowing access to a communication network for the security module associated with the user device, the request being addressed to the contact address of the server and comprising a datum allowing said server to forward the request to a control server;
a module for receiving a confirmation of execution of said act of administration.

This user device can of course comprise in structural terms the various characteristics which relate to the method for administrating a subscription such as described above and which can be combined or taken in isolation. Thus, the advantages stated in respect of the method for administrating a subscription according to the first aspect are transposable directly to the user device. Consequently, they are not detailed more fully.

According to a third aspect, the invention also relates to a server configured to prepare subscription management data. This server comprises:
a processing module, designed to receive a request for execution of an act of administration in conjunction with a subscription to an operator originating from a security module, said subscription allowing access to a communication network for the security module associated with a user device, the request being addressed to the contact address of the server and comprising a datum allowing said server to forward the request to a control server, said address having been obtained on the basis of an access profile for accessing the communication network installed in the security module, and to transmit the request for execution to the control server as a function of said datum and to transmit a received confirmation of execution of said act of administration from the control server to the user device.

This server is a server responsible for preparing the subscription management data SM-DP+. The advantages stated in respect of the method for administrating a subscription according to the first aspect are transposable directly to the server. Consequently, they are not detailed more fully.

According to a fourth aspect, the invention also relates to a system comprising a user device according to the second aspect, a server configured to prepare subscription management data according to the third aspect and a control server. This control server comprises:

a processing module, designed to execute an act of administration in conjunction with a subscription in response to a request for execution received from the server configured to prepare subscription management data and to send a confirmation of execution of said act of administration to the server configured to prepare subscription management data.

The advantages stated in respect of the method for administrating a subscription according to the first aspect are transposable directly to the system. Consequently, they are not detailed more fully.

According to a fifth aspect, the invention relates to a program for a user device, comprising program code instructions intended to control the execution of those of the steps of the method for administrating a subscription previously described that are implemented by the user device, when this program is executed by this device and a recording medium readable by a server on which a program for a device is recorded.

The advantages stated in respect of the method for administrating a subscription according to the first aspect are transposable directly to the program for a device and to the recording medium.

According to a sixth aspect, the invention relates to a program for a server, comprising program code instructions intended to control the execution of those of the steps of the method for administrating a subscription previously described that are implemented by the server, when this program is executed by this server and a recording medium readable by a server on which a program for a server is recorded.

The advantages stated in respect of the method for administrating a subscription according to the first aspect are transposable directly to the program for a server and to the recording medium.

BRIEF DESCRIPTION OF THE DRAWINGS

The technique for administrating a subscription to a communication network will be better understood with the aid of the following description of particular embodiments, with reference to the appended drawings in which.

DETAILED DESCRIPTION OF ILLUSTRATIVE EMBODIMENTS

Figure 1:
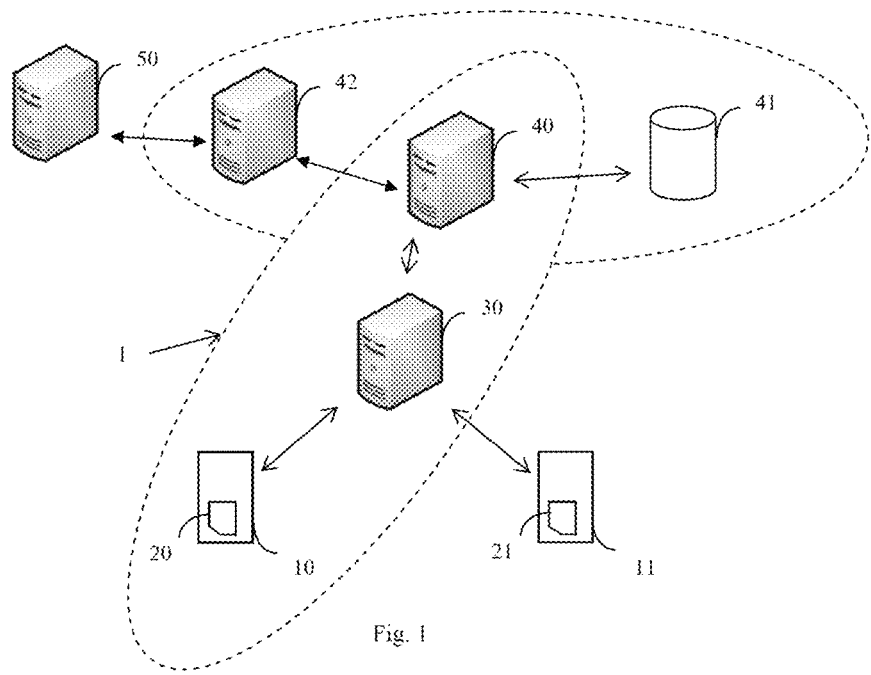
FIG. 1 represents an environment in which the method for administrating a subscription in a particular embodiment is implemented.

FIG. 1 represents an environment in which the method for administrating a subscription to a communication network in a particular embodiment is implemented.

Hereinafter in the description, examples are presented of several embodiments applying to a security module of eUICC card type such as undergoing standardization within the framework of the GSMA association, but the method for administrating a subscription also applies to other types of security module. More generally, the security module is an inviolable dedicated platform, comprising hardware and software, able to securely host applications and their confidential and cryptographic data and providing a secure execution environment for applications, for example a card of UICC type.

The description which follows is concerned with the context of technical specifications, such as are defined by the GSMA association. More precisely, the architecture for remote configuration management is defined in the technical specification SGP.21 "RSP Architecture", version 2.0, dated 23 Aug. 2016 and the procedures are defined in the technical specification SGP.22 "RSP Technical Specification" version 2.0 dated 14 Oct. 2016.

A user device 10, with which a security module 20 is associated, is designed to access the network of a mobile operator by means of an access profile for the network generated by this operator for this security module. The user device 10 in association with the security module 20 form a first mobile terminal. More precisely, the access profile is generated for this security module by a subscription data management server, which is not represented in FIG. 1, linked with the operator. The access profile comprises an application for accessing the network and associated access data (one speaks of "credentials" in English), such as algorithms and cryptographic keys. The access profile once authorized allows access to an infrastructure of a mobile network of this operator. It makes it possible in particular to authenticate the mobile terminal, more precisely the security module 20, upon access to the operator's network. A second user device 11 and its associated security module 21 are also represented in FIG. 1. The user device 11 in association with the security module 21 form a second mobile terminal.

The communication network of the mobile operator, called mobile network, is for example a wireless communication network of 3G or 4G type, such as standardized by the 3GPP. The user devices 10, 11 each comprise a communication module, designed to access the communication network.

The access profile is identified by a unique number ICCID (for "Integrated Circuit Card ID") making it possible to identify the access profile in a security module.

The security module 20, 21 is typically a card of "eUICC" type (from the English "embedded Universal Integrated Circuit Card"), also called "eSIM" (from the English "embedded Subscriber Identity Module"), or embedded or irremovable SIM card. No limitation is attached to this type of card. In a particular embodiment, the security module 20, 21 is a chip card with an operating system offering the functionalities of a card of eUICC type. In another particular embodiment, the security module 20, 21 is integrated into the user device 10, 11 thus forming a single entity. Each security module 20, 21 is identified by a security module identifier EID (for "eUICC-ID").

In FIG. 1 is also represented an operational control server 40, for example integrated into the network operator's information system. This control server 40 is designed to coordinate the various configuration operations in the information system and in the operator's network upon a subscription of a new user, a modification of a subscription or else upon obtaining of an access profile. The control server 40 interacts in particular with a server 30 able to provide by downloading to a security module an access profile which has been prepared for it. This server is responsible for preparing the subscription management data SM-DP+ (for "Subscription Manager Data Preparation"). The role of this server is to:

prepare profile folders ("Profile Package" in English), store profile protection keys in a secure manner and protected profile folders in a memory area, and allocate profile folders as a function of a security module identifier.

The server 30 links a protected profile folder to a security module and downloads, once a secure downloading session has been established, this or these access profiles linked to an LPA (for "Local Profile Assistant") application executing on the user device.

In FIG. 1, there also figures a database 41 accessible by the control server 40. This database 41 is a repository making it possible to store subscription information in respect of this operator.

The control server 40 is a server of the OSS (for "Operation Support System") operational support system. The operational control server 40 communicates with a server 42 for control of the business support system BSS. This business support system BSS is more precisely responsible for client management, for managing the data of a command, for billing and for setting tariffs. A single control server is represented for each of the support systems. Of course each of these systems can comprise one or more servers.

A Web site or a portal 50 is designed to interact with a user and to communicate with the operational control server 40 and the business control server 42.

It is underscored here that for the sake of simplification, other items of equipment in particular responsible for operations and maintenance, for billing, for order taking, are not represented in this FIG. 1. The same holds for items of equipment of the operator's network.

Figure 2A:
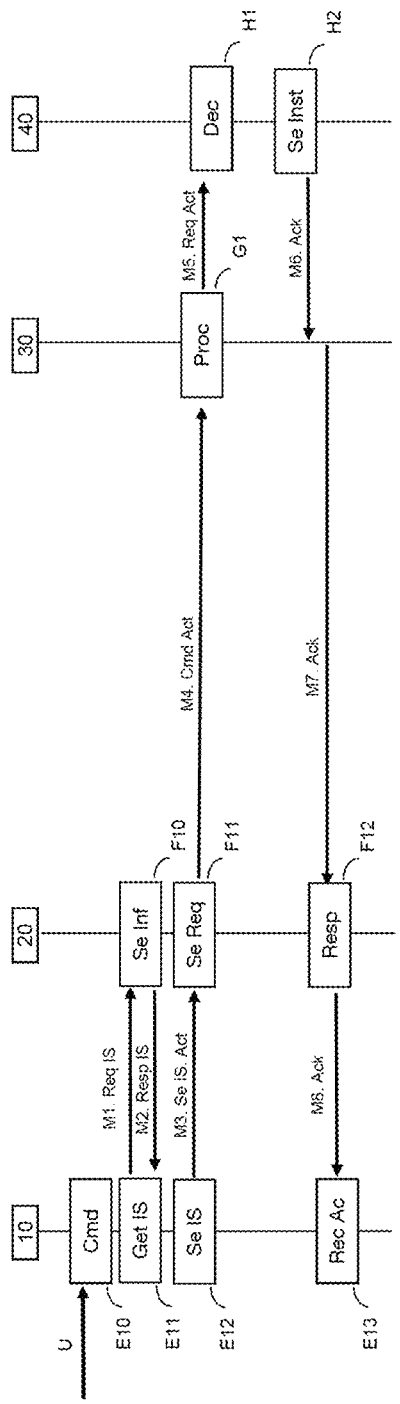
FIG. 2a illustrates steps of a method for administrating a subscription to a communication network according to a first particular embodiment.

The method for administrating a subscription to an operator will now be described in conjunction with FIG. 2a in a first particular embodiment.

In the initial state, it is assumed that the user of the user device 10 and of the security module 20 has taken out a subscription with a communication network operator. In return, he has obtained an activation code AC (for "Activation Code") which has made it possible for him to install on the security module 20 an access profile for accessing the network ICCID. Once the access profile has been installed, the user can access the communication network and the services provided by the operator of the network within the framework of his subscription contract. The security module 20 has thus obtained an access profile for accessing the network in conjunction with this subscription.

A user or a pool manager has decided to perform an act of administration in conjunction with this subscription.

This request for execution of an act of administration can be transmitted by means of a man-machine interface of an application offered by the operator on the user device 10. No limitation is attached to the way of transmitting this command. In a particular embodiment, this application offered by the operator corresponds to the LPA application. The act of administration corresponds for example to a request for modification of a subscription, a request for an activation code, a suspension of the access profile. Such a suspension of the access profile may be envisaged during maintenance of the mobile terminal. By way of illustration, the subscription makes it possible to associate a single security module. Four choices can be offered in an interaction menu: "add a second security module to my subscription", "subscribe to a multi-security module option on the basis of my current subscription", "transfer my subscription to a new security module", "suspend an access profile".

The user device 10 thus receives in a step E10 a command for execution of an act of administration in conjunction with a subscription to the operator.

In a step E11, the user device 10, more precisely the LPA application, requests, by a message M1, the security module 20 to provide it with the contact address of the server 30 responsible for preparing the subscription management data, an identification datum and a subscription identifier ID_S. The identification datum allows the server SM-DP+ 30 to determine (in particular when this server SM-DP+ is shared by several operators) and then to interrogate the operational control server 40 so as to forward a request for execution of an act of administration, as described subsequently. The datum corresponds for example to an identifier of the operator. The subscription identifier ID_S makes it possible to identify the subscription which is associated with the request. In an exemplary embodiment, the subscription identifier corresponds to a contract number in the operator's information system. The contract number is for example stored in the access profile by means of an action of personalization of the latter, requiring dynamic generation of the access profile. In another exemplary embodiment, the subscription identifier corresponds to the identifier of the access profile ICCID which has been downloaded into the security module 20.

We are concerned hereinafter with the case where these items of information have been provided to the security module 20 while distributing the access profile ICCID in data associated with this access profile. These data are supplied by the operator. The identification datum may for example correspond to an operator identifier in the data. In another exemplary embodiment, the identification datum corresponds to a field "Service Provider Name" present in metadata associated with the access profile. In another exemplary embodiment, the identification datum corresponds to the pair MCC (for "Mobile Country Code"), MNC (for "Mobile Network Code").

The message M1 is received by the security module 20 in a step F10. In response, the security module 20 sends a message M2, comprising the contact address of the server SM-DP+ 30, the identification datum and the subscription identifier ID_S.

In a step E12, the user device 10, more precisely the LPA application of this device, sends a message M3 to the security module 20. This message M3 carries an item of information relating to an act of administration to be executed and comprises in particular the contact address of the server SM-DP+, the identification datum and the subscription identifier ID_S. It is intended to trigger a sending by the security module 20 of a request for execution of an act of administration in association with the identifier subscription ID_S.

The message M3 is received by the security module 20 in a step F11. Still in this step F11, the security module 20 sends a message M4 representing a signed certificate containing the data described as well as the security module identifier EID and the request for execution of an act of administration to the server SM-DP+ 30 by way of the user device 10. More precisely, as illustrated in FIG. 10 "Common Mutual Authentication Procedure" of technical specification SGP 22 v2.0, this message is sent in a first tunnel established between the user device 10, more precisely the LPA application executing on the user device 10 and the server SM-DP+ 30, relying on a second tunnel established between the security module 20 and the server SM-DP+ 30. It is underscored here that by simplification, FIG. 2a represents a direct relation between the security module 20 and the server SMDP+ 30 whilst the message M4 travels through the user device 10 to reach the server SMPD+ 30. This message M4 is addressed to the server SM-DP+ 30 at the contact address and comprises in particular the act of administration to be executed, the identification datum allowing the server SM-DP+ 30 to forward the request to the operational control server 40, the subscription identifier ID_S, associated with the act of administration to be executed, and the security module identifier EID. When the act of administration to be executed corresponds to a request for activation code for another security module, for example the security module 21, the message M4 furthermore comprises the latter's security module identifier EID.

This message M4 is received by the server SM-DP+ 30 in a step G1. The server SM-DP+ 30 determines that this involves a request to be forwarded to an operator's information system. In an exemplary embodiment, the server SM-DP+ detects the presence of a data object of "action" type. The server SM-DP+ 30 then sends a message M5 to the operational control server 40 of the operator identified by the identification datum received. This message M5 requesting execution of an act of administration comprises in particular the act of administration to be executed, the subscription identifier ID_S and the security module identifier EID. The interface between the server SM-DP+ 30 and the operational control server 40, called interface ES2+ and defined in the specifications of the GSMA Association, is thus adapted to allow the sending of the message M5, allowing the server SM-DP+ 30 to forward a request for execution of an act of administration to the operational control server 40.

The message M5 is received by the operational control server 40 in a step H1. The operational control server 40 determines as a function of the act of administration to be executed and of the current subscription, which are received in the message M5, the actions which must be implemented in the operator's information system. These actions are not further detailed here.

In a step H2, the operational control server 40 sends a message M6 to the server SM-DP+ 30 refusing or confirming the execution of the act of administration. This message M6 is retransmitted in the form of a message M7 by the server SM-DP+ 30 to the security module 20.

The security module 20 sends the user device 10 a message M8 refusing or confirming the execution of the message M3 commanding administration of a subscription. This message M8 is received in a step E13.

The user device 10 can then inform the user or the pool manager thereof by way of his man-machine interface.

The method for administrating a subscription to an operator will now be described in conjunction with FIGS. 2a and 2b in a second particular embodiment.

In this second particular embodiment, the steps described above in conjunction with the first mode are identical up to the receiving by the operational control server 40 of the message M5 requesting execution of an act of administration in step H1.

The operational control server 40 determines as a function of the act of administration to be executed and of the current subscription, which are received in the message M5, the actions which must be implemented in the operator's information system. These actions are not further detailed here. Still in this step H1, the operational control server 40 detects that an interaction with the user of the device 10 is requested. The operational control server 40 stores the context of this request for execution of an act of administration and associates a reference Ref with this context.

In step H2, the operational control server 40 sends a message M6 to the server SM-DP+ 30 refusing or confirming the execution of the act of administration. This message M6 comprises in particular a location address or universal address URL (for "Uniform Resource Locator") of the portal 50 and the reference Ref associated with the execution context. This message M6 is retransmitted in the form of a message M7 by the server SM-DP+ 30 to the security module 20.

The security module 20 sends the user device 10, more precisely the LPA application, a message M8 refusing or confirming the execution of the message M3 commanding administration of a subscription. This message M8 is received in a step E13.

Figure 2B:
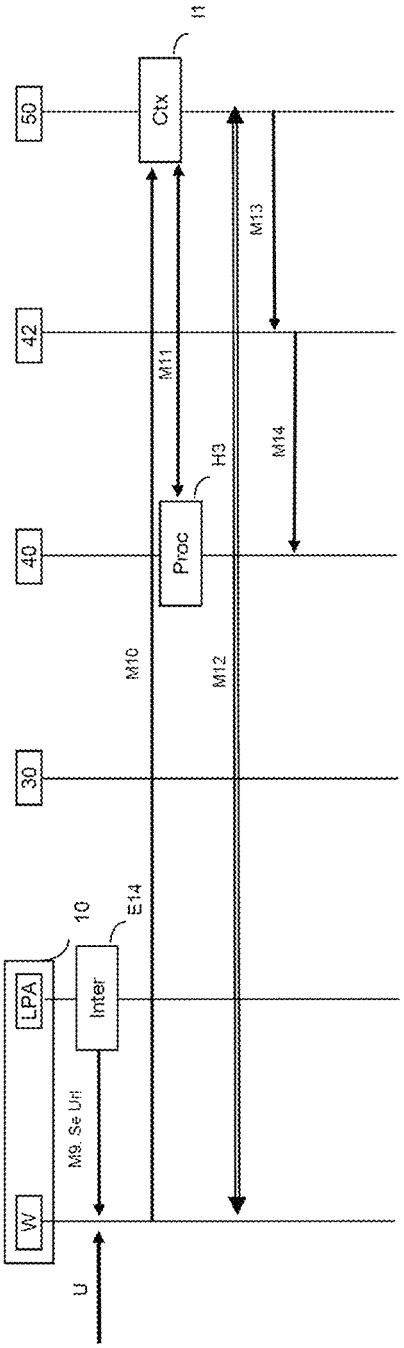
FIG. 2b illustrates steps of a method for administrating a subscription to a communication network according to a second particular embodiment.

The description of this second mode is now continued with reference to FIG. 2b.

In a step E14, the LPA application detects that the message M8 requests a complementary interaction of the user of the device 10 with the operator's information system so as to finalize the request for execution of the act of administration. The LPA application extracts the URL location address and the reference Ref of the message M8 and triggers by a message M9 an interaction with the user by way of the execution of an application of Webview type. This application establishes a connection (message M10) with the portal 50 by means of the location address and transmits the reference Ref.

The portal 50 receives the message M10 in a step I1 and asks the operational control server 40 for the context associated with the reference Ref. In a step H3, the operational control server 40 sends the portal 50 the context of the request for execution of the act of administration that it has stored in association with the reference Ref. This exchange is represented in FIG. 2b by an exchange M11.

The portal 50 then interacts with the user by way of the application executing on the user device 10 (exchange M12) as a function of the context of the request for execution so as to obtain complementary information. This may involve by way of example a confirmation of the request by the user by means of a security code. It may also involve business information requested by the business control server 42.

Once an agreement has been established for the execution of the act of administration, actions are implemented in the operator's information system. The business control server 42 is informed (message M13) of the agreement and of the actions to be put in place. These actions are not further detailed here. The operational support system OSS, and in particular the operational control server 40, receives orders (message M14) to be executed. If necessary, the server SM-DP+ 30 also receives orders to be executed. The execution of the act of administration terminates with a deletion of the context with which the reference is associated.

In the second embodiment such as described, the URL location address is common to all the requests and the context associated with the request for execution of the act of administration is retrieved as a function of a reference. Alternatively, the location address is specific to the context associated with the request for execution of the act of administration and makes it possible to retrieve the context.

In the embodiments described, an act of administration in conjunction with a subscription has thus been able to be performed in a simple manner by the user or the pool manager. The second embodiment furthermore presents the advantage of allowing enriched interaction with the user or the pool manager.

In the embodiments described, the contact address of the server SM-DP+, the identification datum and the subscription datum ID_S have been provided in data associated with the access profile during the downloading of the latter into the security module 20.

In another particular embodiment, only the contact address of the server SM-DP+ is provided in data associated with the access profile during the downloading of the latter into the security module 20. The access profile identifier ICCID is transmitted in the various messages exchanged in the guise of datum allowing the server SM-DP+ to identify and to interrogate a control server and in the guise of subscription identifier. On the basis of the access profile identifier ICCID, the server SM-DP+ 30 determines the operator concerned and thus the control server to be contacted. On the basis of the access profile identifier ICCID, the operational control server 40 can obtain the associated contract number by interrogating the database 41. This makes it possible to limit the modifications to be made to the access profile.

In another particular embodiment, the identification datum is obtained by one of the items of equipment (user device 10, server SM-DP+ 30) on the basis of the network access identifier, known by the name IMSI, in particular on the basis of the fields MCC and MNC.

In a particular embodiment, the subscription identifier ID_S is supplied by the user or the pool manager by means of the man-machine interface of the application offered by the operator on the user device 10 as a supplement to the command for execution of an act of administration.

In a particular embodiment, a security code is provided by the user by means of the man-machine interface of an application offered by the operator on the first user device 10. This security code may for example be provided at the same time as the association command. In a variant embodiment, the security code is verified by the security module 20. In another variant embodiment, the security code is transmitted in the various messages M3 (from the user device 10 to the security module 20), M4 (from the security module 20 to the server SM-DP+ 30) and M5 (from the server SM-DP+ 30 to the operational control server 40). The operational control server 40 then verifies the security code during step H1. This security code makes it possible to verify that the execution of the act of administration was indeed requested by an authorized user. It is underscored here that this security code may in certain particular embodiments correspond to that of the security module or else that of the user device.

In an exemplary embodiment, the user of the device 10 wishes to modify his subscription to a subscription comprising several security modules ("multi-SIM"). The method is implemented a first time to modify the subscription. Next, the method is implemented a second time to request the preparation of an access profile from the device 10 for the second security module 21. In return, the device 10 receives an activation code that it transmits to the second device 11, for example by way of a short-range link. The second device 11 and the second security module 21 then obtain the access profile by downloading from the server SM-DP+.

No limitation is attached to these various embodiments and the person skilled in the art is able to define others making it possible to command by way of the server responsible for preparing the subscription management data an execution of an act of administration from a user device with which a security module is associated with an access profile installed within the framework of a subscription.

Figure 3:
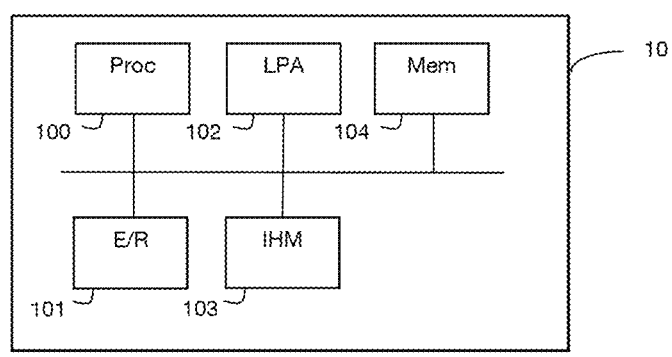
FIG. 3 represents a user device according to a particular embodiment.

FIG. 3 illustrates in a schematic manner a user device 10 in a particular embodiment. A security module 20 is associated with this user device 10. This security module 20 has obtained a communication network access profile in conjunction with a subscription for the user device 10 with an operator. The user device 10 comprises in particular:

a processor 100 for executing code instructions of software modules;

a memory area 104, designed to store an application which comprises code instructions for implementing the steps of the method for administrating a subscription;

a storage memory, not represented, designed to store data used during the implementation of the administration method;

a communication module 101, designed to access a communication network, in particular to send and receive messages;

an interaction module 103, designed to receive a command for associating a second user device 11 with this subscription;

a command module 102, designed to obtain on the basis of an access profile for accessing the communication network installed in the security module a contact address of a server (30) configured to prepare subscription management data and to command the security module to send a request for execution of an act of administration in conjunction with a subscription to an operator, the request being addressed to the contact address of the server and comprising a datum allowing said server to forward the request to a control server.

The communication module 101 is in particular designed to receive a confirmation of execution of said act of administration.

In a particular embodiment, the command module 102 is also designed to implement an LPA application.

In a particular embodiment, the interaction module 103 is designed to interact with a user of the user device 10 by way of a man-machine interface.

In a particular embodiment, the command module 102 is also designed to obtain the datum allowing the server to interrogate the control server on the basis of the access profile.

It is underscored here that the user device 10 also comprises other processing modules, not represented in FIG. 3, designed to implement the various user device functions.

Figure 4:
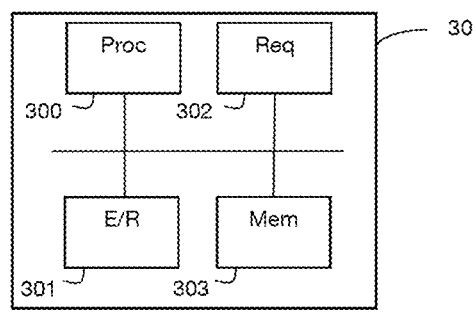
FIG. 4 represents a server according to a particular embodiment.

FIG. 4 illustrates in a schematic manner a server 30 configured to prepare subscription management data in a particular embodiment. More precisely, this server 30 is a server SM-DP+. The server 30 comprises in particular:

a processor 300 for executing code instructions of software modules;

a memory area 303, designed to store an application which comprises code instructions for implementing the steps of the method for administrating a subscription;

a storage memory, not represented, designed to store data used during the implementation of the administration method;

a communication module 301, designed to communicate with security modules and with servers of an operator;

a processing module (302), designed to:
receive a request for execution of an act of administration in conjunction with a subscription to an operator originating from a security module (20), said subscription allowing access to a communication network for the security module associated with a user device (10), the request being addressed to the contact address of the server and comprising a datum allowing said server to forward the request to a control server, said address having been obtained on the basis of an access profile for accessing the communication network installed in the security module;

transmit the request for execution to the control server as a function of said datum and to transmit a received confirmation of execution of said act of administration from the control server to the user device.

It is underscored here that the server 30 also comprises other processing modules, not represented in FIG. 4, designed to implement the various server SM-DP+ functions.

The technique for administrating a subscription is implemented by means of software components and/or hardware components. In this regard, the term "module" may correspond in this document equally to a software component, to a hardware component or to a set of hardware and/or software components, able to implement a function or a set of functions, according to what is described above in respect of the module in question.

A software component corresponds to one or more computer programs, one or more subroutines of a program, or more generally to any element of a program or of software. Such a software component is stored in memory and then loaded and executed by a data processor of a physical entity, and is able to access the hardware resources of this physical entity (memories, recording media, communication buses, electronic input/output cards, user interfaces, etc.).

In the same way, a hardware component corresponds to any element of a hardware assembly. It may be a programmable or non-programmable hardware component, with or without an integrated processor for executing software. It is for example an integrated circuit, a chip card, an electronic card for the execution of firmware, etc.

In a particular embodiment, the modules 102, 103 are designed to implement the administration method described above. This preferably involves software modules comprising software instructions for executing those of the steps of the method for administrating a subscription described above that are implemented by a user device. The invention therefore also relates to:

a program for a user device, comprising program code instructions intended to control the execution of the steps of the method for administrating a subscription described above, when said program is executed by this device;

a recording medium readable by a device on which the program for a device is recorded.

In a particular embodiment, the module 302 is designed to implement the administration method described above. This preferably involves software modules comprising software instructions for executing those of the steps of the method for administrating a subscription described above that are implemented by a server. The invention therefore also relates to:

a program for a server, comprising program code instructions intended to control the execution of the steps of the method for administrating a subscription described above, when said program is executed by this server;

a recording medium readable by a server on which the program for a server is recorded.

The software modules may be stored in or transmitted by a data medium. This may be a hardware storage medium, for example a CD-ROM, a magnetic floppy disk or a hard disk, or else a transmission medium such as an electrical, optical or radio signal, or a telecommunication network.

The invention relates furthermore to a system 1 comprising:

a user device 10 such as described above, a server 30 such as described above configured to prepare subscription management data, and a control server 40.

The control server comprises:

a processing module, designed to execute an act of administration in conjunction with a subscription in response to a request for execution received from the server configured to prepare subscription management data and to send a confirmation of execution of said act of administration to the server configured to prepare subscription management data.

Although the present disclosure has been described with reference to one or more examples, workers skilled in the art will recognize that changes may be made in form and detail without departing from the scope of the disclosure and/or the appended claims.

The invention claimed is:

1. A method for administrating a subscription to an operator, said subscription allowing access to a communication network for a security module associated with a user device, said method comprising:
obtaining by the user device a contact address on the basis of an access profile installed in the security module for accessing the communication network, the contact address being an address of a server configured to prepare subscription management data;
sending by the security module a request for executing an act of administration in conjunction with said subscription, the request being addressed to the contact address of the server and comprising an identification datum allowing said server to forward the request to a control server of the operator identified by the identification datum; and
receiving by the user device a confirmation of execution of said act of administration.

2. The administration method as claimed in claim 1, in which the confirmation of execution comprises a location address of a portal to which the user device connects.

3. The administration method as claimed in claim 2, in which the confirmation of execution furthermore comprises a reference associated with a context of the request for execution of the act of administration.

4. The administration method as claimed in claim 1, in which the identification datum allowing the server to interrogate the control server is obtained on the basis of the access profile.

5. The administration method as claimed in claim 1, in which the request sent furthermore comprises a subscription identifier in respect of a subscription to the operator.

6. The administration method as claimed in claim 1, in which the act of administration belongs to the group consisting of:
   a request for modification of a subscription;
   a request for an activation code;
   a suspension of the access profile.

7. A method for administrating a subscription to an operator, said subscription allowing access to a communication network for a security module associated with a user device, said method comprising:
   receiving by a server configured to prepare subscription management data a request for executing an act of administration in conjunction with said subscription originating from the security module, the request being addressed to a contact address of the server and comprising an identification datum allowing said server to forward the request to a control server of the operator identified by the identification datum, said address having been obtained on the basis of an access profile installed in the security module for accessing the communication network;
   transmitting the request for executing by said server to the control server as a function of said identification datum; and
   transmitting a received confirmation of execution of said act of administration from the control server to the user device.

8. A user device with which is associated a security module, said device comprising:
   a processor; and
   a non-transitory computer-readable medium comprising instructions stored thereon, which when executed by the processor configure the user device to:
   obtain a contact address on the basis of an access profile installed in the security module for accessing a communication network, the contact address being an address of a server configured to prepare subscription management data;
   command the security module to send a request for execution of an act of administration in conjunction with a subscription to an operator, said subscription allowing access to the communication network for the security module associated with the user device, the request being addressed to the contact address of the server and comprising an identification datum allowing said server to forward the request to a control server of the operator identified by the identification datum; and
   receive a confirmation of execution of said act of administration.

9. A server configured to prepare subscription management data, said server comprising:
   a processor; and
   a non-transitory computer-readable medium comprising instructions stored thereon, which when executed by the processor configure the server to:
   receive a request for execution of an act of administration in conjunction with a subscription to an operator originating from a security module, said subscription allowing access to a communication network for the security module associated with a user device, the request being addressed to the contact address of the server and comprising an identification datum allowing said server to forward the request to a control server of the operator identified by the identification datum, said address having been obtained on the basis of an access profile installed in the security module for accessing the communication network,
   transmit the request for execution to the control server as a function of said identification datum, and
   transmit a received confirmation of execution of said act of administration from the control server to the user device.

10. A non-transitory recording medium readable by a user device and on which is recorded a program comprising instructions which when executed by a processor of the user device configure the user device to administrate a subscription to an operator, said subscription allowing access to a communication network for a security module associated with the user device, wherein the instructions configure the user device to:
    obtain a contact address on the basis of an access profile installed in the security module for accessing the communication network, the contact address being an address of a server configured to prepare subscription management data;
    send by the security module a request for executing an act of administration in conjunction with said subscription, the request being addressed to the contact address of the server and comprising an identification datum allowing said server to forward the request to a control server of the operator identified by the identification datum; and
    receive by the user device a confirmation of execution of said act of administration.

11. A non-transitory recording medium readable by a server and on which is recorded a program comprising instructions which when executed by a processor of the server configure the server to administrate a subscription to an operator, said subscription allowing access to a communication network for a security module associated with a user device, wherein said instructions configure the server to:
    receive a request for executing an act of administration in conjunction with said subscription originating from the security module, the request being addressed to a contact address of the server and comprising an identification datum allowing said server to forward the request to a control server of the operator identified by the identification datum, said address having been obtained on the basis of an access profile installed in the security module for accessing the communication network;
    transmit the request for executing by said server to the control server as a function of said datum; and
    transmit a received confirmation of execution of said act of administration from the control server to the user device.

* * * * *